United States Patent
Wang et al.

(10) Patent No.: US 10,152,651 B2
(45) Date of Patent: Dec. 11, 2018

(54) MEDICAL IMAGE PROCESSING APPARATUS AND MEDICAL IMAGE PROCESSING METHOD

(71) Applicant: Toshiba Medical Systems Corporation, Otawara-shi (JP)

(72) Inventors: Shaobin Wang, Beijing (CN); Qi Chen, Beijing (CN); Yang Zhang, Beijing (CN); Yanhua Wang, Beijing (CN); Jialin Zhang, Beijing (CN); Minfeng Xu, Beijing (CN); Jianchun Zhao, Beijing (CN); Xiaotian Yang, Beijing (CN)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/926,341

(22) Filed: Oct. 29, 2015

(65) Prior Publication Data

US 2016/0125604 A1    May 5, 2016

(30) Foreign Application Priority Data

Oct. 31, 2014  (CN) .......................... 2014 1 0602444
Aug. 31, 2015  (JP) ................................ 2015-171078

(51) Int. Cl.
*G06K 9/62*       (2006.01)
*G06T 7/11*       (2017.01)
(Continued)

(52) U.S. Cl.
CPC .............. *G06K 9/6211* (2013.01); *G06T 7/11* (2017.01); *G06T 7/162* (2017.01); *G06T 7/174* (2017.01);
(Continued)

(58) Field of Classification Search
CPC . G06T 2207/30101; G06T 2207/10072; G06T 2207/10081; G06T 7/162;
(Continued)

(56) References Cited

U.S. PATENT DOCUMENTS

7,646,903 B2   1/2010 Kaftan et al.
2006/0030958 A1*  2/2006 Tschirren ............ G06F 19/3437
                                                    700/90
(Continued)

*Primary Examiner* — Jingge Wu
(74) *Attorney, Agent, or Firm* — Oblon, McClelland, Maier & Neustadt, L.L.P.

(57) ABSTRACT

A medical image processing apparatus according to an embodiment includes acquisition circuitry, extraction circuitry, calculation circuitry, and determination circuitry. The acquisition circuitry configured to acquire a first photographic image and a second photographic image that contain tree structures of a subject. The extraction circuitry configured to extract branch points of each of the tree structures in the first photographic image and the second photographic image. The calculation circuitry configured to calculate the similarities between the branch points in the first photographic image and the branch points in the second photographic image based on the feature quantities of the branch points. The determination circuitry configured to determine the corresponding path between the branch points in the first photographic image and the branch points in the second photographic image based on the similarities between the branch points calculated by the calculation circuitry.

10 Claims, 9 Drawing Sheets

(51) Int. Cl.
*G06T 7/162* (2017.01)
*G06T 7/174* (2017.01)

(52) U.S. Cl.
CPC ............. *G06T 2207/10081* (2013.01); *G06T 2207/30061* (2013.01)

(58) Field of Classification Search
CPC ............ G06T 2207/30061; G06T 7/11; G06T 2200/04; G06T 2207/20072; G06T 2210/41; G06T 7/33; G06T 2207/20016; G06T 7/174; G06T 7/73
See application file for complete search history.

(56) References Cited

U.S. PATENT DOCUMENTS

| | | | | |
|---|---|---|---|---|
| 2006/0153435 A1* | 7/2006 | Wallmark | ............. | G06T 7/0012 382/129 |
| 2007/0001879 A1* | 1/2007 | Kaftan | ................ | G06K 9/6206 341/79 |
| 2007/0031019 A1* | 2/2007 | Lesage | ...................... | G06T 7/60 382/131 |
| 2008/0187199 A1* | 8/2008 | Gulsun | ................ | G06K 9/4638 382/131 |
| 2008/0205722 A1* | 8/2008 | Schaefer | ................... | G06T 7/11 382/128 |
| 2009/0148024 A1* | 6/2009 | Park | ........................ | G06T 7/187 382/134 |
| 2009/0208078 A1* | 8/2009 | Fritz | ..................... | G06T 7/0012 382/130 |
| 2010/0296709 A1* | 11/2010 | Ostrovsky-Berman | ...................... | G06T 7/162 382/128 |
| 2011/0188715 A1* | 8/2011 | Shotton | .................... | G06K 9/00 382/128 |
| 2012/0082358 A1* | 4/2012 | Kiraly | ................... | G06T 7/0014 382/131 |
| 2012/0128219 A1* | 5/2012 | Thomas Bernard Pascal | ............. | G06T 7/187 382/128 |
| 2012/0263364 A1 | 10/2012 | Tschirren et al. | | |
| 2012/0269407 A1* | 10/2012 | Criminisi | .............. | G06T 7/0048 382/128 |
| 2012/0269410 A1* | 10/2012 | Ihara | ........................ | G06T 7/162 382/128 |
| 2012/0275682 A1* | 11/2012 | Ihara | ..................... | G06T 7/162 382/134 |
| 2013/0108133 A1* | 5/2013 | Inoue | .................... | G06T 3/0037 382/131 |
| 2014/0270429 A1* | 9/2014 | Nair | ....................... | G06T 7/0012 382/128 |
| 2015/0187085 A1* | 7/2015 | Ihara | ........................ | A61B 5/08 382/128 |

* cited by examiner

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Chinese Patent Application No. 201410602444.2, filed on Oct. 31, 2014 and Japanese Patent Application No. 2015-171078, filed on Aug. 31, 2015; the entire contents of which are incorporated herein by reference.

FIELD

Embodiments described herein relate to a medical image processing apparatus and a medical image processing method.

BACKGROUND

In recent years, there have been medical image processing apparatuses that resolve the conditions of chronic obstructive pulmonary disease (COPD), emphysema, tracheal and bronchial diseases and the like. For example, a medical image processing apparatus matches the positions (matching) of a plurality of images containing tree structures and acquired in different phases of the bronchial three-dimensional (3D) images. However, there are some physiological and pathological differences among 3D images, and variations are present between 3D images in different phases due to motions such as respiration. This leads to difficulty in realizing automatic position matching between 3D images and problems, such as sensitivity to noise, a large amount of computation and so on.

According to Patent Literature 1 (U.S. Pat. No. 7,646,903), tree-like structures representative of physical objects or models are acquired, a path is extracted from a tree-like structure, a path is extracted from another tree-like structure, the two paths are compared to each other by calculating the similarity measurement results, and it is determined whether the paths match up based on the similarity measurement results.

According to Patent Literature 2 (U.S. Laid-open Patent Publication No. 2012/0263364), the matching algorithm is based on association diagram method, and the computation time is significantly reduced by introducing hierarchic separation as well as matching only two sub-trees at once.

However, the disadvantage of the technology described in Patent Literature 1 is in sensitivity to noise and incorrect central line and in that there are too many feature points and too much computation load.

The disadvantage of the technology described in Patent Literature 2 is in that the primary branch points are sensitive to noise and incorrect central line and solving the association diagram is a difficulty in NP solution and there is too much computation load.

Figure 12:
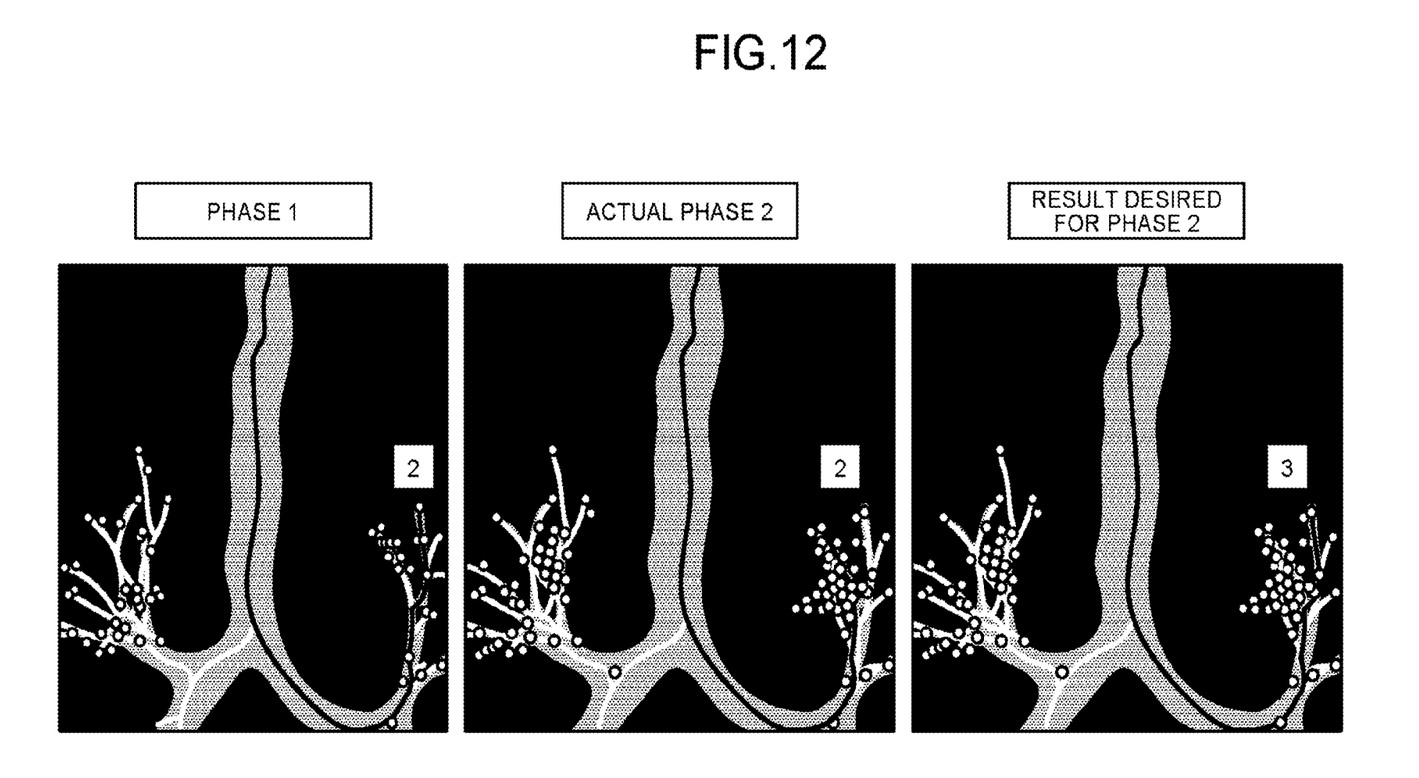
FIG. 12 is a diagram showing exemplary position matching results in the prior art.

Exemplary position matching results according to the prior art will be described. FIG. 12 is a diagram showing exemplary position matching results according to the prior art. When position matching using an image acquired in a phase (hereinafter, referred to as Phase 1) as a base image is performed, the actual position matching results in an image acquired in another phase (hereinafter, Phase 2) for the path of the user's interest marked with "2" (the left diagram in FIG. 12) in the image acquired in Phase 1 are the path marked with "2" (the center diagram in FIG. 12). The position matching results desired for Phase 2 are, as shown in the right diagram in FIG. 12, the path marked with "3". As described above, it can be seen that the path marked with "2" that is the actual matching results in the image acquired in Phase 2 significantly shifts to the left.

DETAILED DESCRIPTION

A medical image processing apparatus according to an embodiment includes acquisition circuitry, extraction circuitry, calculation circuitry, and determination circuitry. The acquisition circuitry configured to acquire a first photographic image and a second photographic image that contain tree structures of a subject. The extraction circuitry configured to extract branch points of each of the tree structures in the first photographic image and the second photographic image. The calculation circuitry configured to calculate the similarities between the branch points in the first photographic image and the branch points in the second photographic image based on the feature quantities of the branch points. The determination circuitry configured to determine the corresponding path between the branch points in the first photographic image and the branch points in the second photographic image based on the similarities between the branch points calculated by the calculation circuitry.

The determination circuitry of the medical image processing apparatus according to the embodiment is configured to determine the corresponding branch points between the first photographic image and the second photographic image based on the similarities between the branch points calculated by the calculation circuitry and take the path consisting of the respective determined branch points as the corresponding path between the tree structures.

When the determination circuitry is configured to determine a plurality of paths, the calculation circuitry of the medical image processing apparatus according to the embodiment is configured to calculate the similarities between a reference path in the first photographic image and each of the paths in the second photographic image, based on a set of the feature quantities of various branch points constituting the paths, and the determination circuitry is configured to determine the corresponding path between the tree structures, based on the similarities between the various paths calculated by the calculation circuitry.

The acquisition circuitry of the medical image processing apparatus according to the embodiment is configured to include: multi-level acquisition circuitry configured to divide a tree structure into a plurality of levels toward outside from the root of the tree structure, taking the level where the seed points locate as start points, acquire the corresponding portions of the tree structure in the respective levels in turn, and combine the acquired portions into a complete tree structure.

The method determination circuitry of the medical image processing apparatus according to the embodiment is configured to evaluate the acquisition results on the former level and, based on the result of the evaluation, determine the acquisition method to be performed by the multi-level acquisition circuitry for the current level.

The method determination circuitry of the medical image processing apparatus according to the embodiment is configured to take the acquisition method for the level where the seed points locate as region growing and repeat a process of adaptively acquiring the segmentation results of the current level by adaptively adjusting the parameters of the current level based on the feedback of the segmentation results on the former level until the growth of the whole tree structure has been completed.

The medical image processing apparatus according to the embodiment further includes division circuitry configured to divide the tree structure into a plurality of areas, wherein the extraction circuitry is configured to extract the branch points in the areas based on the areas divided by the division circuitry.

The division circuit of the medical image processing apparatus according to the embodiment is configured to determine an area of concern, and the extraction circuitry configured to extract the branch points for only the area of concern.

The determination circuit of the medical image processing apparatus according to the embodiment is configured to take the branch points extracted by the extraction circuitry as branch point candidates and rank the various branch point candidates based on the similarities between the branch points.

The calculation circuitry of the medical image processing apparatus according to the embodiment is configured to calculate the similarities between the various branch points based on the positions of the branch points in the tree structure after weighting the various branch points.

The calculation circuitry of the medical image processing apparatus according to the embodiment is configured to divide the tree structure into levels based on the growth levels of the tree structure and calculate only the similarities between the branch points in the same level.

Furthermore, a medical image processing apparatus according to an embodiment includes multi-level acquisition circuitry and method determination circuitry. The multi-level acquisition circuitry is configured to divide a tree structure into a plurality of levels, taking the level where the seed points locate as start points, acquire the corresponding portions of the tree structure in the respective levels in turn, and combine the acquired portions into a complete tree structure. The method determination circuitry is configured to evaluate the acquisition results on the former level and, based on the results of the evaluation, determine the acquisition method to be performed by the multi-level acquisition circuitry for the current level.

A medical image processing method according to an embodiment includes: by acquisition circuitry, acquiring a first photographic image and a second photographic image that contain tree structures of a subject; by extraction circuitry, extracting branch points of each of the tree structures in the first photographic image and the second photographic image; by calculation circuitry, calculating the similarities between the branch points in the first photographic image and the branch points in the second photographic image based on the feature quantities of the branch points; and, by determination circuitry, determining the corresponding path between the branch points in the first photographic image and the branch points in the second photographic image based on the similarities between the branch points calculated by the calculation circuitry.

A medical image processing method according to an embodiment includes: by multi-level acquisition circuitry, dividing a tree structure into a plurality of levels, taking the level where the seed points locate as start points, acquiring the corresponding portions of the tree structure in the respective levels in turn, and combining the acquired portions into a complete tree structure; and, by method determination circuitry, evaluating the acquisition results on the former level and, based on the results of the evaluation, determining the acquisition method to be performed by the multi-level acquisition circuitry for the current level.

The embodiments will be described in detail below with reference to the drawings. The following descriptions will take tree structures of bronchus as an example. However, the embodiments are not limited to the processing on the images representing the tree structures of bronchus, i.e., including but not limited to the processing for trachea and bronchus, and it can also include the processing on the images representing other tree structures such as the structures of cranial nerve and blood vessel.

First Embodiment

Figure 1:
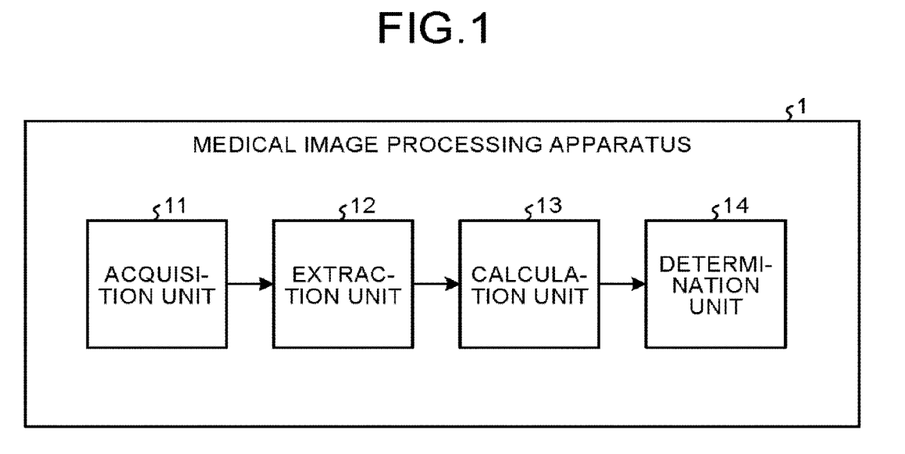
FIG. 1 is a block diagram showing an exemplary configuration of a medical image processing apparatus according to a first embodiment.

First, a medical image processing apparatus 1 of an embodiment will be described. FIG. 1 is a block diagram showing an exemplary configuration of a medical image processing apparatus according to the first embodiment. As shown in the example in FIG. 1, the medical image processing apparatus 1 includes an acquisition unit 11, an extraction unit 12, a calculation unit 13, and a determination unit 14. The acquisition unit 11, the extraction unit 12, the calculation unit 13, and the determination unit 14 are realized by a processor. The processor includes circuitry.

The acquisition unit 11 acquires a first photographic image and a second photographic image containing tree structures of a subject in different phases. Here, the acquisition unit 11 extracts the tree structures from the photographic images with various existing methods of extracting a tree structure.

The extraction unit 12 extracts the branch points of the various tree structures contained in the first photographic image and in the second photographic image. A branch point is a point representing the root where a branch locates in a tree structure.

Furthermore, in the present embodiment, in the case of displaying tree structures with central lines of tree stem, the convergence points of different central lines are taken as branch points. The calculation unit 13 calculates the similarities between the branch points in the first photographic image and the branch points in the second photographic image based on the feature quantities of the branch points.

The calculation unit 13 is capable of calculating the feature quantities of the various branch points in tree structures by comparison. For example, in the case that the region of the subject represented by the tree structure is bronchus, the calculation unit 13 selects certain preferable feature quantities, such as coordinates, direction, and branch level, from among a plurality of feature quantities of the branch points based on the calculation ability of the calculation unit 13 etc., and calculates the similarities by using a comparison function.

The determination unit 14 determines the corresponding path between the tree structure in the first photographic image and the tree structure in the second photographic image based on the similarities between the branch points calculated by the calculation unit 13.

The medical image processing apparatus 1 may be realized with a computer by reading a program and executing the read program to carry out the functions of the above-described various components, and may also be realized by the hardware configurations, such as integrated circuits, forming the above-described various components respectively.

Figure 2:
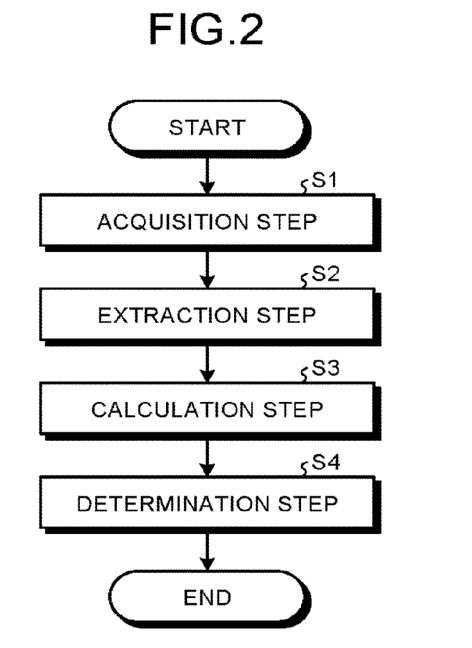
FIG. 2 is a flow chart showing an exemplary medical image processing method performed by the medical image processing apparatus according to the first embodiment.

The medical image processing method performed by the medical image processing apparatus 1 according to the present embodiment will be described below. FIG. 2 is a flow chart showing the exemplary medical image processing method performed by the medical image processing apparatus 1 according to the first embodiment.

As shown in FIG. 2, the medical image processing method performed by the medical image processing apparatus 1 includes an acquisition step S1, an extraction step S2, a calculation step S3 and a determination step S4. In the acquisition step S1, the acquisition unit 11 acquires a first photographic image and a second photographic image that contain the tree structures of a subject. In the extraction step S2, the extraction unit 12 extracts the branch points of each of the tree structures contained in the first photographic image and in the second photographic image. In the calculation step S3, the calculation unit 13 calculates the similarities between the branch points in the first photographic image and the branch points in the second photographic image based on the feature quantities of the branch points. In the determination step S4, the determination unit 14 determines the corresponding path between the branch points in the first photographic image and the branch points in the second photographic image based on the similarities between the branch points calculated in step S3.

One specific example of the medical image processing method performed by the medical image processing apparatus 1 according to the first embodiment will be described below. The specific example gives an example just to make it easier to understand the embodiment and is not intended to limit the embodiment.

In the specific example, in the acquisition step S1, the acquisition unit 11 acquires the central line trees in the photographic images in all phases. The central line tree so-called herein is referred to as the tree structure representing the tree stem as the central line.

Then, in the extraction step S2, the extraction unit 12 extracts the branch points of the portion of the central line in the photographic image in a first phase (hereinafter, it may be referred to as a first photographic image) and the branch points of the portion of the central line in the photographic image in a second phase (hereinafter, it may be referred to as a second photographic image). The first phase is the phase in which a photographic image containing the path serving as a reference for performing position matching is acquired. The path serving as the reference for performing position matching is also referred to as a reference path. The reference path is the path of the user's interest. The second phase is a phase in which a photographic image containing a path for which position matching with the reference path is to be performed is acquired.

Figure 3:
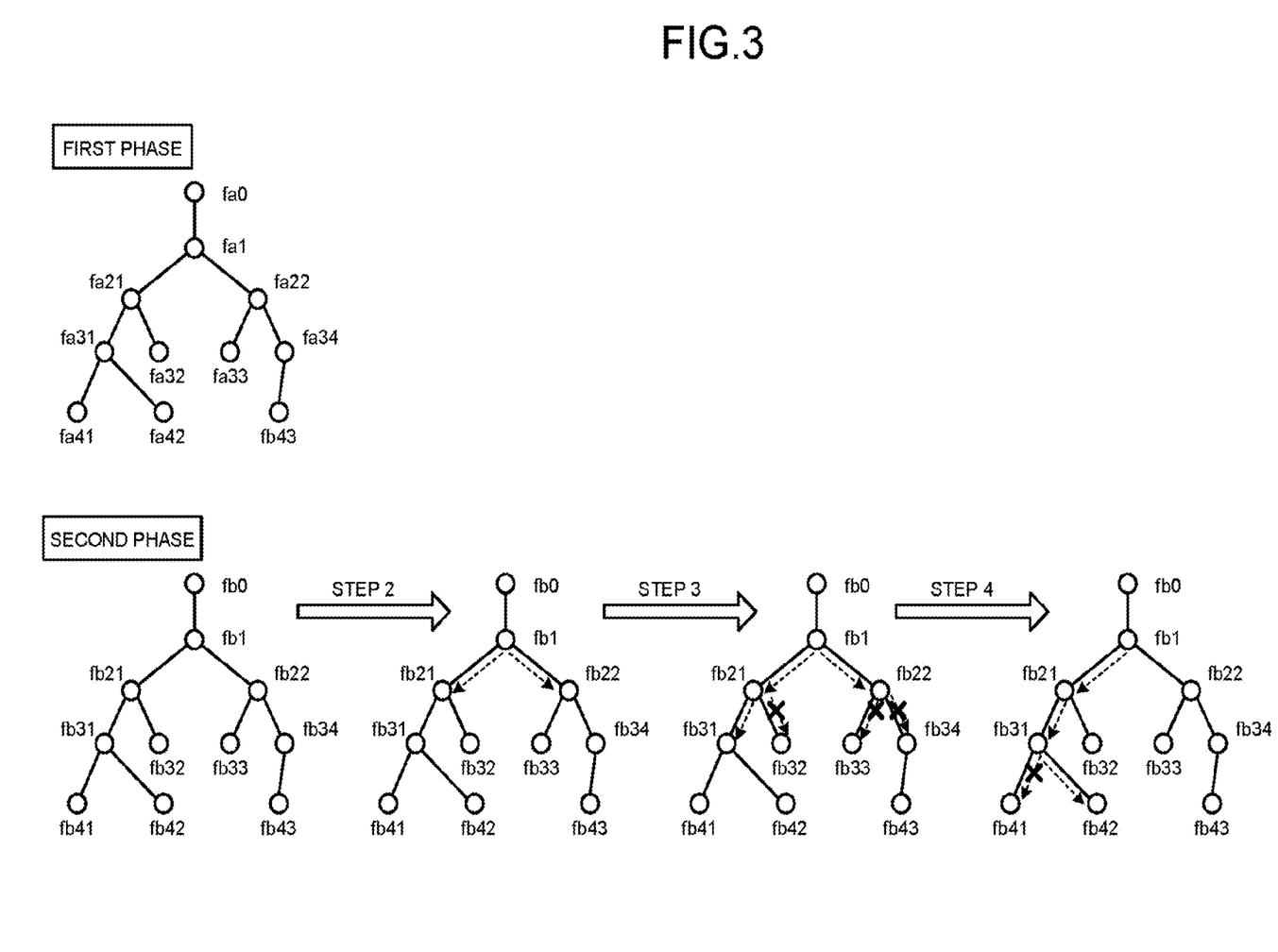
FIG. 3 is a schematic diagram for explaining exemplary position matching of branch points of tree structures according to the embodiment.

The calculation unit 13 performs the calculation step S3. The exemplary calculation step S3 of the embodiment will be described with reference to FIG. 3. FIG. 3 is a schematic diagram for explaining the exemplary position matching of the branch points of the tree structures according to the embodiment. The process of determining the path corresponding to the reference path by calculating the similarities between the branch points will be described with reference to FIG. 3. The position matching object in FIG. 3 is the path (fa0-fa1-fa21-fa31-fa42) in the first photographic image. In other words, in the example in FIG. 3, the object is to obtain the path corresponding to the path (fa0-fa1-fa21-fa31-fa42) in the first photographic image from the second photographic image by position matching.

In the case of marking the branch points with the features of the branch points, given the feature quantity of the branch points in the first photographic image is fa, and given the feature quantity of the branch points in the second photographic image is fb. First, the similarities between the branch points fa1 of the first photographic image in the first phase and the branch point fb1 of the second photographic image in the second phase are calculated.

For the specific example of the feature quantity, for example, the feature of each branch point is $f_n=[x1,x2,x3,x4,x5,x6,x7]^T$, i.e., is represented by an array of 7 features, wherein x1 represents the branch point position, x2 represents the angle of the vertex formed by the horizontal direction and any one of the central lines branched off from the branch point, x3 represents the length of fragment (e.g., the total of the length of two of the central lines branched off from the branch point), x4 represents the angle of fragment (e.g., the angle of the vertex formed by two of the central lines branched off from the branch point), x5 represents the similarities between a template image representing the cross section of bronchus and a cross-sectional image containing the branch points and orthogonal to the central line, and x6 represents the area of torus of the cross section containing the branch points and orthogonal to the central line, and x7 represents a profile parameter (e.g., circularity of torus in the cross section containing the branch points and orthogonal to the central line).

The calculation for similarities is performed based on the information of the tree structure branch points, such as the area of cross section. For example, in the case that given the feature quantity of a branch point in the first photographic image is fa1 and given the feature quantity of a branch point in the second photographic image is fb1, then the similarities between the two branch points are represented by the function S(fa1,fb1). Here, S(fa1,fb1)>δ, where δ is the preset threshold and the threshold δ is acquired in advance based on experience or statistical results.

When the resulting similarities from the calculation is greater than δ, the search for the branch points in the subsequent level is proceeded on, followed by step S2.

In step S2, the similarities between fa21 and fb21, fb22 is calculated, where the results are $S(fa21,fb21)>\delta$, and $S(fa21,fb22)>\delta$.

Because $S(fa21,fb21)>\delta$, $S(fa21,fb22)>\delta$ and the similarities are greater than the preset threshold, the selected branch points fb21, fb22 are valid. If it is the case that similarities are less than the preset threshold, it is terminated at the branch points i.e., the search for the branch points in the subsequent level is ceased.

Proceed to step S3, where the similarities between fa31 and fb31, fb32, fb33, fb34 are calculated and the results are $S(fa31,fb31)>\delta$, $S(fa31,fb32)<\delta$, $S(fa31,fb33)<\delta$, $S(fa31,fb34)<\delta$.

Here, at the branch points b32, b33, b34 where the similarities are less than δ, further search for the branch points in the subsequent level is ceased.

In step S4, the similarities between fa42 and fb41, fb42 are calculated where the results are $S(fa42,fb41)<\delta$, $S(fa42,fb42)>\delta$.

Then, the determination unit 14 determines the corresponding branch points between the first photographic image and the second photographic image based on the calculated similarities of the branch points in step S4, and takes the path consisting of the various determined branch points as the corresponding path between the tree structures, i.e., through the above-described calculation step S3, the path finally determined by the determination unit 14 is b0→b1→b21→b31→b42 in the determination step S4. In this manner, the position matching over the bronchus area (lung) is performed.

The medical image processing apparatus 1 determines a corresponding path between a first photographic image and a second photographic image by the above-described position matching. The medical image processing apparatus 1 determines corresponding paths in a plurality of phases by repeatedly performing the position matching and analyzes the bronchi represented by the determined paths over time, thereby outputting the analysis results over time. For example, the medical image processing apparatus 1 generates a graph representing variations in the scale of the area of the cross section of bronchus in the determined paths and displays the generated graph. Alternatively, the medical image processing apparatus 1 may generate a video image of the cross section of the bronchus in the determined paths and display the generated video image.

The medical image processing apparatus 1 and the medical image processing method of the first embodiment enables fully automatic and highly precise position matching between images containing tree structures and enables higher robustness to noise and incorrect central line in position matching.

Further, the corresponding branch points between the first photographic image and the second photographic image can be determined based on the similarities of the calculated branch points, and the path consisting of the determined various branch points can be determined precisely as the corresponding path between the tree structures.

Further, according to the embodiment, since the path is determined after the similarities are calculated for only the branch points and the branch points from and after the branch point with similarity smaller than the threshold are removed continuously in the calculation process, so the computation load is substantially reduced compared to that in the prior art, so the efficiency of calculation can be improved.

Further, for sake of description, a description is made for only the position matching between images in two different phases performed by the medical image processing apparatus 1. However, the medical image processing apparatus 1 may also acquire a plurality of images in three or more phases and select one as the first photographic image in the first phase from the acquired images while taking the other images as the second photographic images, respectively, to match each of the second photographic images with the first photographic image. The position matching may also be performed between a plurality of photographic images, thereby the position matching of a set of photographic images is completed.

(Modification of First Embodiment)

Figure 4:
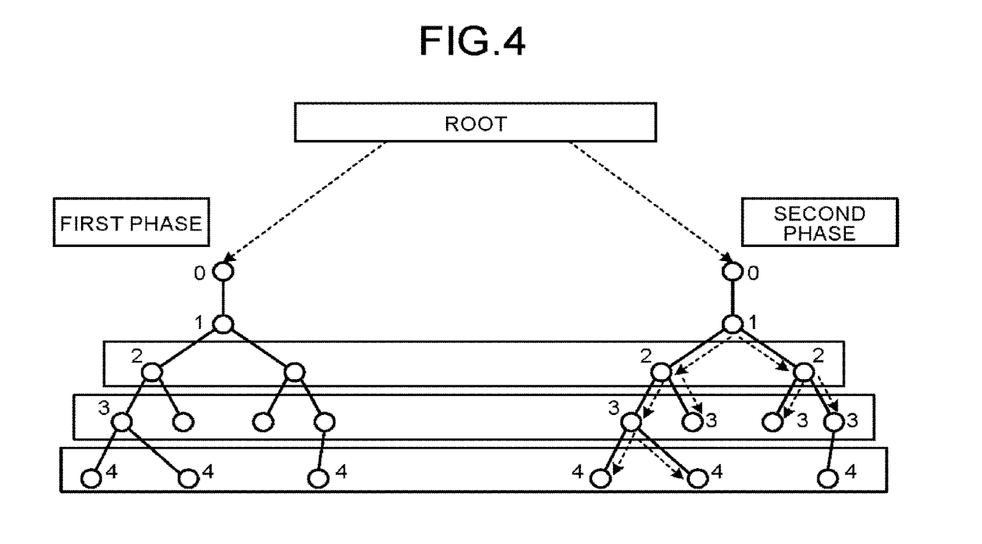
FIG. 4 is a diagram for explaining an exemplary modification of the first embodiment.

The calculation unit 13 may calculate only the similarities between the branch points in the same level based on the levels of the tree structures. Such a modification will be described as a modification of the first embodiment. FIG. 4 is a diagram for explaining the exemplary modification of the first embodiment.

As shown in the example in FIG. 4, for each of the levels from the top to the bottom of the tree structures, the calculation unit 13 finds out, as candidate branch points, branch points corresponding to various branch points (reference branch points) in the first photographic image acquired in the first phase from the second photographic image acquired in the second phase. The calculation unit 13 takes branch points with similarities to the reference branch points greater than a certain threshold as candidate branch points, thereby finally determining the route consisting of the candidate branch points.

Second Embodiment

According to the first embodiment and the modification of the first embodiment, the determination unit 14 determines a path consisting of branch points with similarities greater than the threshold in the second photographic image. For this reason, in the case that a plurality of paths consist of the branch points with similarities greater than the threshold in the second photographic image, it may be assumed that a plurality of paths are determined in the second photographic image. An embodiment where, in the case that a plurality of path is determined, one of the paths is determined at last will be described as a second embodiment. The second embodiment will be described with reference to FIGS. 5, 6, 7 and 8. The block diagram of the second embodiment is the same as that of the first embodiment, but the operations of the extraction unit 12, the calculation unit 13 and the determination unit 14 according to the second embodiment consist of the operations to be described below in addition to the operations of the extraction unit 12, the calculation unit 13 and the determination unit 14 according to the first embodiment, which will be described in detail below. Furthermore, the contents of the descriptions of the first embodiment will not be repeated and the corresponding descriptions in the first embodiment will be cited.

In the case that the determination unit 14 determines a plurality of paths in a second photographic image, the calculation unit 13 of the embodiment calculates the similarities between the path of the tree structure in the first photographic image and each of the paths of the tree structure in the second photographic image based on a set of feature quantities of various branch points constituting the path. The determination unit 14 determines the corresponding path between the tree structure in the first photographic image and the tree structure in the second photographic image based on the similarities between the path of the tree structure in the first photographic image and each of the paths of the tree structure in the second photographic image that are calculated by the calculation unit 13.

One specific example of the medical image processing method performed by the medical image processing apparatus 1 of the second embodiment will be described below. The specific example is taken as an example just to make it easier to understand the embodiment and is not intended to limit the embodiment.

Figure 5:
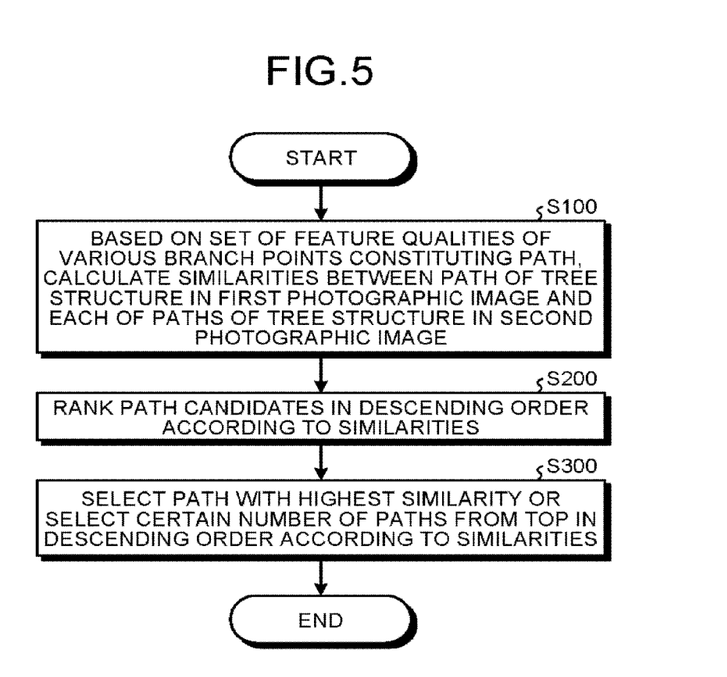
FIG. 5 is a flow chart showing an exemplary position matching process according to a second embodiment.
Figure 6:
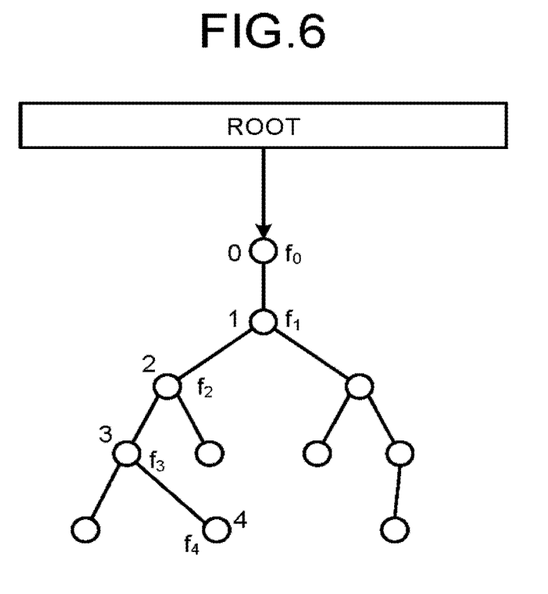
FIG. 6 is a schematic diagram showing exemplary extracted feature points.
Figure 7:
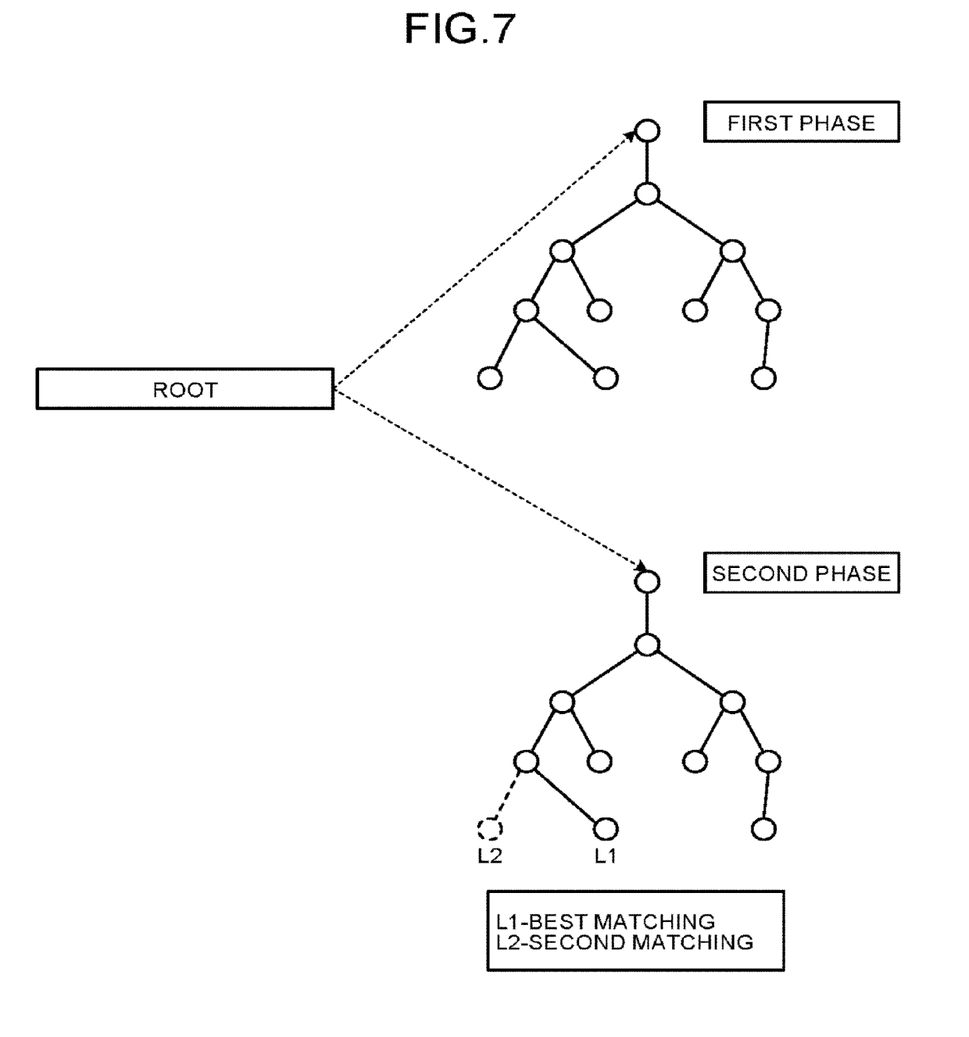
FIG. 7 is a schematic diagram showing exemplary position matching results.

FIG. 5 is a flow chart showing the exemplary position matching process according to the second embodiment. FIG. 6 is a schematic diagram showing extracted exemplary feature points. FIG. 7 is a schematic diagram showing exemplary position matching results.

The position matching process shown in FIG. 5 is executed in the case that the determination unit 14 determines a plurality of paths in a second photographic image. As shown in FIG. 5, based on a set of feature quantities of various branch points constituting the path, the calculation unit 13 calculates the similarities between the path of the tree structure in the first photographic image and each of the paths of the tree structure in the second photographic image (step S100). For example, when the central line represents the tree structure, a set of feature quantities of all the branch points constituting a certain central line represents the feature quantity of the path, thereby the similarities between the reference path in the photographic image in the first phase and each of the paths of the photographic image in the second phase are calculated. The paths in the photographic image in the second phase refer to a plurality of paths determined by the determination unit 14 in the second photographic image. Because the paths are candidate paths for the reference path, they are also referred to as candidate paths.

The determination unit 14 ranks the path candidates in descending order according to the similarities (step S200). The determination unit 14 selects a candidate path with the highest similarity as the path corresponding to the reference path and takes the selected candidate path as position matching results or selects a certain number of candidate paths from the top in descending order according to the similarities and takes the selected candidate paths as the position matching results (step S300).

Further, the determination unit 14 may weight the feature quantities of the various branch points constituting the path, thereby calculating the similarities more precisely. A specific example will be described with reference to FIG. 6 below.

As shown in the example in FIG. 6, the extraction unit 12 first extracts the features of the paths. Given the features of various branch points are fn, then the feature vector of the path is a set of feature quantities of all the branch points, which is represented as: Vr=[f0, f1, f2, f3, f4], where "0, 1, 2, 3, 4" represents the orientation of the paths, where 0 represents the first branch point starting from the root, 1, 2, 3, 4 represents the subsequent branch point of the path starting from the former branch point in turn. In other words, "0, 1, 2, 3, 4" here correspond to different levels of the paths (the branch levels of the path).

As the importance of the branch points differ on different levels, the feature points have to be weighted according to the levels: Vr=[w0*f0, w1*f1, w2*f2, w3*f3, w4*f4], where w0, w1, w2, w3, w4 represents the weights corresponding to the levels. For example, the weight may be increased as level increases. Note that "*" represents an operator.

Next, the calculation unit 13 performs the position matching algorithm of the tree search based on the features of the branch points.

Here also given the features of the various branch points are $f_n=[x1,x2,x3,x4,x5,x6,x7]^T$.

The calculation unit 13 obtains the feature vector of the reference path (hereinafter, referred to as a reference feature vector) with the feature vectors of the various branch points constituting the reference path. The calculation unit 13 further obtains the feature vector of each candidate path (hereinafter, referred to as a candidate feature vector) with the feature vectors of various branch points constituting each of the candidate paths. The feature vector Vn of each candidate path is represented as follows.

$$Vn=[w0'*f0, w1'*f1, w2'*f2, w3'*f3, w4'*f4],$$

where w0', w1', w2', w3' and w4' are weights corresponding to the levels.

Then, the calculation unit 13 may calculate, per candidate feature vector, the similarities between two vectors (the reference feature vector and the candidate feature vector) in the feature space based on the reference feature vector and each of the candidate feature vectors. To calculate the similarities between two vectors, for example, standard similarity measurement and other similarity measurements may be employed.

The determination unit 14 may rank the candidate paths based on the similarities per candidate feature vector. For example, the determination unit 14 may rank the candidate paths such that that rank increases as the similarity increases. The determination unit 14 may output the ranked candidate paths. Finally, the determination unit 14 may select the candidate path with the highest similarities as the path corresponding to the reference path and take the selected candidate path as the position matching results, or select a certain number of candidate paths in descending order according to the similarities and take the selected candidate paths as the position matching results.

Accordingly, in the case that, as shown in FIG. 7, there are two candidate paths corresponding to a certain path in the first phase and the branch points differ only in the last level, given the path L1 is the best matching, and the path L2 is the second matching. The best matching refers to the candidate path with the highest similarities and the second matching refers to the candidate path with the second highest similarities.

The calculation unit 13 of the embodiment may calculate, per candidate path, the similarities between the paths of the tree structures based on a set of feature quantities of the various branch points constituting the paths and the determination unit 14 may perform position matching on the paths based on the similarities per candidate path, thus the position matching between the images containing the tree structures can be performed fully automatically and highly precisely.

Third Embodiment

For the above-described first and second embodiments, the case that the acquisition unit 11 extracts the tree structures from the photographic images with the conventional method of extracting tree structures has been described above; however, the acquisition unit 11 may extract tree structures not with the conventional method of extracting a tree structure but with a new method. Such an embodiment in which a tree structure is extracted with the new method will be described as a third embodiment. The operation of the acquisition unit 11 according to the third embodiment is the operation modified from the operation of extracting tree structures performed by the acquisition unit 11 according to the first or second embodiment. Furthermore, the contents of the descriptions of the first and second embodiments will not be repeated and the corresponding descriptions in the first and second embodiments will be cited. In other words, the process of extracting a tree structure from a photographic image performed by the acquisition unit 11 will be described below and descriptions of other processes will be omitted.

Figure 8:
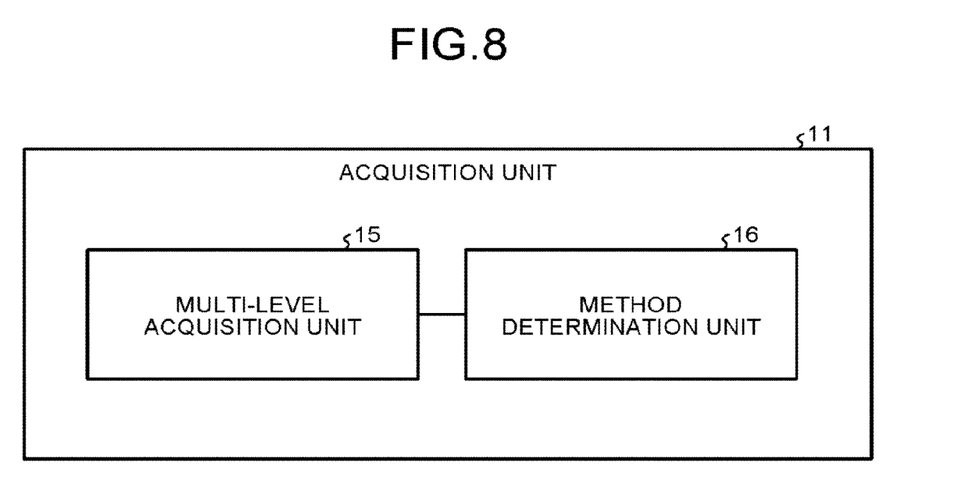
FIG. 8 is a block diagram showing an exemplary configuration of an acquisition unit according to a third embodiment.

FIG. 8 is a block diagram showing exemplary configuration of the acquisition unit 11 according to the third embodiment. The acquisition unit 11 of the embodiment also includes a multi-level acquisition unit 15 that divides a tree structure into a plurality of levels toward outside from the root of the tree structure, taking the level where the seed points locate as start points, acquires the corresponding portions of the tree structure in the respective levels in turn, and combines the acquired portions into a complete tree structure; and a method determination unit 16 that evaluates the acquisition result on the former level and determines the acquisition method for the current level based on the result of the evaluation. The multi-level acquisition unit 15 and the method determination unit 16 are realized by the processor.

Moreover, the method determination unit 16 of the embodiment employs an area growth method as the acquisition method for the level where the seed points. The method determination unit 16 repeats the process of adaptively acquiring the result of the current level by adaptively adjusting the parameters of the current level based on the feedback of the segmentation results on the former level until the growth of the whole tree structure has been completed.

In the following, a specific example of extracting multi-level tree structures by the acquisition unit 11 according to the third embodiment will be described with reference to FIG. 9.

Figure 9:
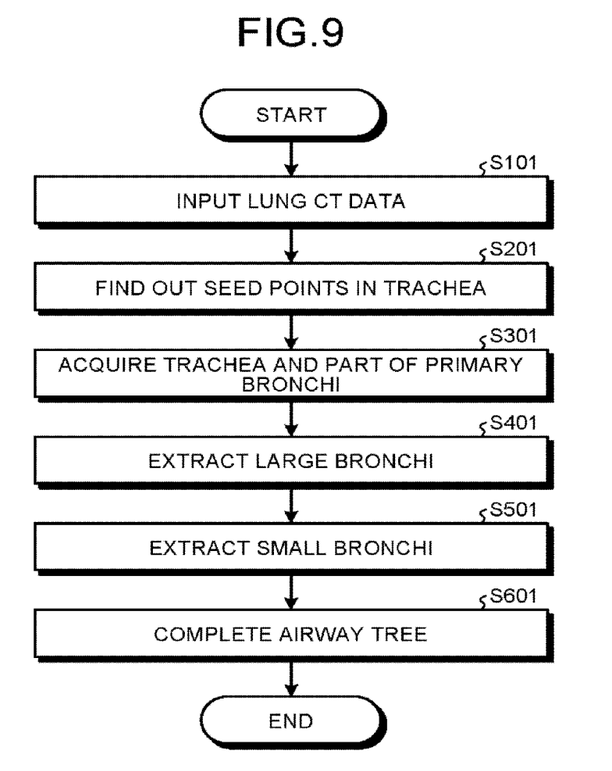
FIG. 9 is a flow chart showing an exemplary flow of acquiring tree structures in various levels according to the third embodiment.

FIG. 9 is a flow chart of exemplary flow of acquiring tree structures on respective levels according to the third embodiment. As shown in FIG. 9, first, the multi-level acquisition unit 15 inputs 3D lung CT data (step S101) and finds seed points in the trachea (step S201). Taking the seed points as the start points, the multi-level acquisition unit 15 then obtains the segmentation results on the first level (step S301). The multi-level acquisition unit 15 extracts all the large bronchi as a set of seed points (step S401), then further extracts surrounding small bronchi (step S501), and completes an airway tree (step S601).

In a specific example, the method determination unit 16 obtains the segmentation results (mainly including the levels 0 to 1 of the trachea tree structure) on the first level from the seed points with a 2D/3D combined region growing, estimates the range of the volume for the overall tree structure according to the segmentation results on the first level, adaptively adjusts the parameters used in the growing process based on the range of the volume, thereby acquiring the main fragments (levels 1-4) of the whole tree structure. On the basis of segmentation results on the first level and the second level, the combination of parameters reconstructed morphologically is adjusted to further obtain the segmentation results on small bronchi.

The parameters, such as the range of the volume of the whole tree structure, the range of CT value, CT mean value, are used when the feedback is from the first level to the second level. The parameters, such as the volume of the initial tree structure and the CT mean value, are used when the feedback is from the second level to the third level.

At step S301 described above, the multi-level acquisition unit 15 obtains the segmentation results (e.g., the trachea and part of the primary bronchi) on the first level (0 level or 0-1 level). In other words, in step S301, the multi-level acquisition unit 15 extracts the tree structure of the first level. Specific examples of the process in steps S301, S401, and S501 will be described below.

For example, in step S301, the method determination unit 16 calculates a mean value M of the CT values of the pixels in a certain area around a seed point (hereinafter, referred to as a CT mean value) in a two-dimensional image containing the seed point. The method determination unit 16 then takes a point having the CT mean value as a new seed point from the above-described certain area. Taking the seed point determined by the method determination unit 16 as a start point in the lung three-dimensional lung CT data, the multi-level acquisition unit 15 then takes the area of pixels having CT values within the range from (M−α) to (M+α) (hereinafter, referred to as the CT-value range) as the tree structure of the first level.

At step S401, the multi-level acquisition unit 15 takes the tree structure of the first level that is extracted at step S301 as a set of seed points and, taking each of the seed points as a start point, extracts the tree structure of the whole large bronchi of the second level by region growing. Taking the tree structure of the large bronchi in a level equal to or less than the second level extracted at step S401 as a set of seed points, the multi-level acquisition unit 15 extracts the small bronchi around the large bronchi by region growing (step S501), thereby completing the tree structure (step S601).

In a specific example, the multi-level acquisition unit 15 obtains the segmentation results (mainly including the level 0 or 0-1 of tree structure) on the first level from the determined new seed point by region growing where two-dimensional and three-dimensional images are to be processed as described above. Based on the segmentation results on the first level, the method determination unit 16 estimates the range of volume of the whole tree structure. Based on the estimated volume range, the above-described CT-value range, and the above-described CT mean value, the method determination unit 16 then adaptively adjusts the parameters used in the growing process for the second level following the first level. For example, the method determination unit 16 uses the above-described volume range, CT-value range, and CT mean value as parameters used in the growing process for the second level. The multi-level acquisition unit 15 takes the tree structure of the first level as a set of seed points and, taking each of the seed points as a start point, grows the 3D gray area with the above-described volume range, CT-value range, and CT mean value as the parameters used in the growing process for the second level, thereby obtaining the main fragments (large bronchi: levels 1 to 4) as the segmentation results on the second level.

Based on the results of segmentation on the first level and the results of segmentation on the second level, the method determination unit 16 adaptively adjusts the parameters used in the growing process for the third level following the second level. For example, the method determination unit 16 uses the volume of the initial tree structure and the CT mean value as parameters used in the growing process for the third level. The volume of the initial tree structure refers to, for example, the volume of the whole tree structure that is estimated based on the segmentation results on the first level. The multi-level acquisition unit 15 takes the tree structure of the second level as a set of seed points and, taking each seed point as a start point and using the volume of the above-described initial tree structure and CT mean value as the parameters used in the growing process for the third level, acquires the tree structure (small bronchi) of the third level as the segmentation results on the third level.

That is, the abundant levels of the tree structures of trachea and the highly accurate results of segmentation of small bronchi are secured by responding to feedback in different levels.

The tree structure extraction method according to the embodiment has the following effect. The maximum value and the minimum value may be defined precisely from the feedback of the first level as the tree structure growing process can be controlled effectively by adjusting the parameters adaptively. Further, because the tree structure has already included most of the bronchi of the (sub-) segment level, the morphological method of extracting a tree structure by a small number of operations according to the embodiment sufficiently saves a lot of time.

In short, the medical image processing apparatus 1 according to the embodiment automatically extracts the airway tree structure from the three-dimensional CT images by extracting the airway tree structures of a plurality of levels by internal feedback. Accordingly, the results on multiple levels and with a low error rate may be obtained. Furthermore, the medical image processing apparatus 1 has robustness to different diseases and/or all kinds of scanning conditions.

Moreover, the tree structure extraction method of the embodiment uses the results on the whole first level to grow the tree structure, which leads to high robustness. While one seed point is necessary to start the algorithm, but the result does not depend on the selection of the seed point. For example, as described above, according to the embodiment, the mean value M of CT values of the pixels in the certain area around the first seed point is calculated and a point having the CT mean value is taken as a new seed point from among the certain area. In the case that the CT value of the pixel of the first seed point is extremely higher or lower than those of the surrounding pixels and the first seed point is directly used to perform region growing, tree structure of bronchi of the first level is not necessarily extracted accurately; however, according to the embodiment, as described above, a point having the CT mean value is taken as a new seed point and the determined seed point is used, which enables accurate extraction of the tree structure of bronchi.

Fourth Embodiment

For the first to third embodiments, the case that position matching is performed over the whole lung (bronchi) has been exemplified. Alternatively, position matching may be performed per area, such as lung lobe. Such an embodiment will be described as a fourth embodiment. The medical image processing apparatus 1 according to the fourth embodiment further includes a division unit in addition to each unit according to the first, second, and third embodiments and thus is capable of performing position matching on a certain selected area.

Figure 10:
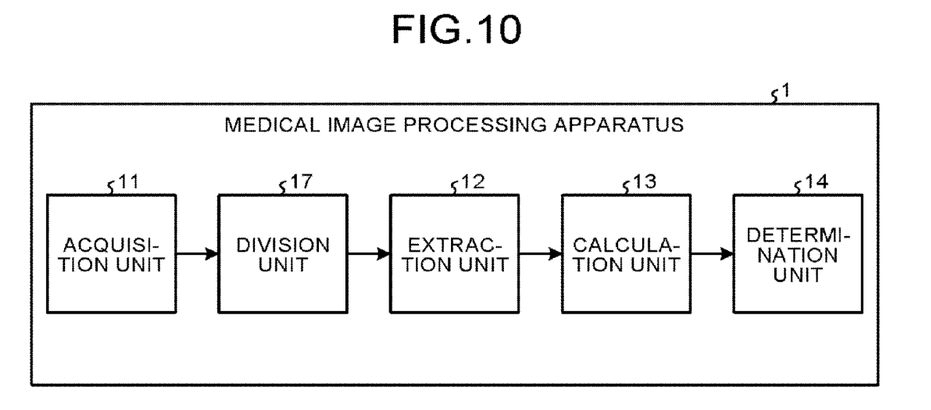
FIG. 10 is a block diagram showing an exemplary configuration of a medical image processing apparatus according to a fourth embodiment.

FIG. 10 is a block diagram showing an exemplary configuration of the medical image processing apparatus according to the fourth embodiment. As shown in the example in FIG. 10, the medical image processing apparatus 1 according to the fourth embodiment further includes a division unit 17 that divides the tree structure into a plurality of areas prior to the process by the extraction unit 12, so the extraction unit 12 may extract the branch points for each area according to the various areas divided by the division unit 17. The division unit 17 is realized by the processor.

Here, the division unit 17 can divide the tree structure into a plurality of areas according to the lung lobe, which is based on the partition of the anatomy, so that position matching can be performed in the subsequent process according to each of the areas of lung lobe. Such position matching in lung lobe level is referred to as lung lobe position matching. The processing amount of lung lobe position matching is less than that of position matching over the lung.

Moreover, the division unit 17 can divide only the area of concern according to the user's indication or results from other analysis apparatus and so on, thereby the extraction unit 12 extracts branch points only in the area of interest.

Figure 11:
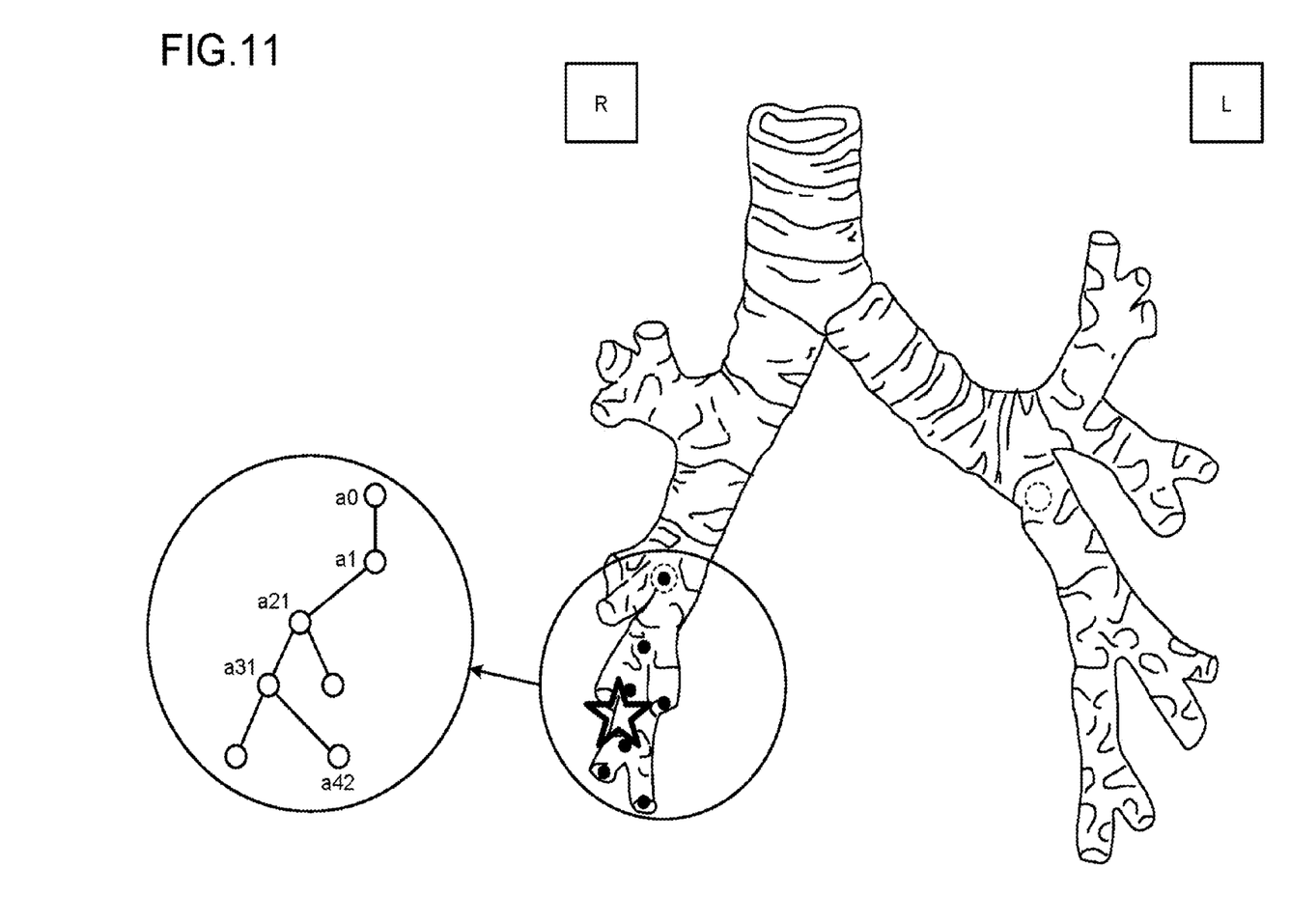
FIG. 11 is a diagram showing exemplary position matching performed in a certain area by the medical image processing apparatus.

FIG. 11 is a diagram for explaining exemplary position matching performed in a certain area by the medical image processing apparatus 1. As shown in FIG. 11, the division unit 17 divides the lung lobe. In the following process, as described above, the extraction unit 12 extracts branch points from the divided lung lobe and, as described above, the calculation unit 13 calculates the similarities between branch points in a first photographic image and branch points in a second photographic image based on the amounts of characteristics of the branch points. The determination unit 14 then determines the corresponding path between the branch points in the first photographic image and the branch points in the second photographic image based on the similarities between the branch points as described above.

According to the embodiment, position matching is performed not on the whole tree structure but in a local area. For this reason, with the results of position matching, the same marker (i.e., biological feature point) can be found more accurately in the images in different phases.

Modification

Various embodiments are described above, but the various embodiments are not limited to the above-described configuration, and they may be modified as follows.

For example, in the above-described embodiment, the determination unit 14 may also determine the branch points extracted by the extraction unit 12 as the branch point candidates in the determination step S4 and rank the various branch point candidates based on the similarities between the branch points in the first photographic image and the branch points in the second photographic image.

Further, for example, in the above-described embodiment, the calculation unit 13 is capable of calculating the similarities between various branch points after weighting the various branch points according to the position of the branch points in the tree structure.

Further, for example, in the above-described embodiment, the calculation unit 13 is capable of calculating only the similarities between the branch points in the same level after dividing the tree structure into different levels according to the level of the tree structure.

The various embodiments of the present invention are described above. The various embodiments acquire the photographic images containing tree structures of an examined subject in different phases, extract the amount of feature of the branch points in the central line of the lung (or lung lobe) by searching for the tree structure according to the tree structure of bronchi, performs position matching by using the information, such as the coordinates of branch points, length and angle of segment, similarities between a certain bronchial cross section and a bronchial cross section containing branch points, cross-sectional area of the bronchus, bronchial cross-sectional shape, thereby enabling fully automatic and highly precise position matching between the 3D images containing the tree structures.

At least one of the medical image processing apparatus and the medical image processing method enables a reduction in the amount of calculation as well as securing of accuracy of image matching.

Some embodiments of the invention have been described, but the embodiments are only for the purpose of exampling, and are not intended to limit the scope of the invention. These embodiments can be implemented by a variety of other modes. Further, various omissions, modifications and alterations can be performed without departing from the scope of the subject of the invention. Such embodiments and their modifications are included in the scope and subject of the invention, and are also included in the scope of the appended claims or the equivalents thereof.

What is claimed is:

1. A medical image processing apparatus, comprising:
acquisition circuitry configured to acquire a first photographic image and a second photographic image that contain tree structures of a subject;
extraction circuitry configured to extract branch points of each of the tree structures in the first photographic image and the second photographic image;
calculation circuitry configured to calculate similarities between the branch points in the first photographic image and the branch points in the second photographic image based on feature quantities of the branch points; and
determination circuitry configured to determine a corresponding path between the branch points in the second photographic image and the branch points in the first photographic image based on the similarities between the branch points calculated by the calculation circuitry, wherein the acquisition circuitry is configured to include:
multi-level acquisition circuitry configured to divide a tree structure into a plurality of levels, taking a level where seed points locate as start points, acquire corresponding portions of the tree structure in the respective levels in turn, and combine the acquired portions into a complete tree structure, and
method determination circuitry configured to evaluate acquisition results on a former level and, based on a result of the evaluation, determine acquisition method to be performed by the multi-level acquisition circuitry for a current level, and
the method determination circuitry is configured to take the acquisition method for the level where the seed points locate as region growing and repeat a process of adaptively acquiring segmentation results of the current level by adaptively adjusting parameters of the current level based on feedback of the segmentation results on the former level until growth of a whole tree structure has been completed.

2. The medical image processing apparatus according to claim 1, further comprising division circuitry configured to divide the tree structure into a plurality of areas, wherein the extraction circuitry is configured to extract the branch points in the areas based on the areas divided by the division circuitry.

3. The medical image processing apparatus according to claim 2, wherein
the division circuitry is configured to determine an area of concern, and
the extraction circuitry is configured to extract the branch points for only the area of concern.

4. The medical image processing apparatus according to claim 1, wherein the determination circuitry is configured to take the branch points extracted by the extraction circuit as branch point candidates and rank various branch point candidates based on the similarities between the branch points.

5. The medical image processing apparatus according to claim 1, wherein the calculation circuitry is configured to calculate the similarities between the branch points based on positions of the branch points in the tree structure after weighting the various branch points.

6. The medical image processing apparatus according to claim 1, wherein the determination circuitry is configured to determine the corresponding branch points between the first photographic image and the second photographic image based on the similarities between the branch points calculated by the calculation circuitry, and take a path consisting of various determined branch points as the corresponding path between the tree structures.

7. The medical image processing apparatus according to claim 1, wherein
when the determination circuitry is configured to determine a plurality of paths, the calculation circuitry is configured to calculate similarities between a reference path in the first photographic image and each of the paths in the second photographic image, based on a set of feature quantities of various branch points constituting the paths, and
the determination circuitry is configured to determine the corresponding path between the tree structures, based on similarities between the paths calculated by the calculation circuitry.

8. A medical image processing apparatus comprising:
multi-level acquisition circuitry configured to divide a tree structure into a plurality of levels, taking a level where a seed point locates as a start point, acquire corresponding portions of the tree structure in the respective levels in turn, and combine the acquired portions into a complete tree structure; and
method determination circuitry configured to evaluate acquisition results on a former level and, based on results of the evaluation, determine acquisition method to be performed by the multi-level acquisition circuitry for a current level, wherein
the method determination circuitry is configured to take the acquisition method for the level where the seed point locates as region growing, estimate a range of volume of a whole tree structure based on segmentation results of a first level and repeat a process of adaptively acquiring segmentation results of the current level by adaptively adjusting parameters of the current level based on feedback of segmentation results on the former level and the estimated range of volume of the whole tree structure until growth of the whole tree structure has been completed.

9. A medical image processing method, comprising:
by multi-level acquisition circuitry, dividing a tree structure into a plurality of levels, taking level where a seed point locates as a start point, acquiring corresponding portions of the tree structure in the respective levels in turn, and combining the acquired portions into a complete tree structure; and by method determination circuitry, evaluating acquisition results on a former level and, based on results of the evaluation, determining acquisition method to be performed by the multi-level acquisition circuitry for a current level, wherein the determining the acquisition comprises taking the acquisition method for the level where the seed point locates as region growing, estimating a range of volume of a whole tree structure based on segmentation results of a first level and repeating a process of adaptively acquiring the segmentation results of the current level by adaptively adjusting parameters of the current level based on feedback of the segmentation results on the former level and the estimated range of volume of the whole tree structure until growth of the whole tree structure has been completed.

10. A medical image processing method, comprising:

acquiring, by acquisition circuitry, a first photographic image and a second photographic image that contain tree structures of a subject;

extracting, by extraction circuitry, branch points of each of the tree structures in the first photographic image and the second photographic image;

calculating, by calculation circuitry, similarities between the branch points in the first photographic image and the branch points in the second photographic image based on feature quantities of the branch points;

determining, by determination circuitry, a corresponding path between the branch points in the second photographic image and the branch points in the first photographic image based on the similarities between the branch points calculated by the calculating, wherein the acquiring, by the acquisition circuitry, includes:

dividing a tree structure into a plurality of levels, taking a level where seed points locate as start points, acquiring corresponding portions of the tree structure in the respective levels in turn, and combining the acquired portions into a complete tree structure, and evaluating acquisition results on a former level and, based on a result of the evaluation, determining acquisition method to be performed by the acquiring for a current level; and taking the acquisition method for the level where the seed points locate as region growing and repeating a process of adaptively acquiring segmentation results of the current level by adaptively adjusting parameters of the current level based on feedback of segmentation results on the former level until growth of the whole tree structure has been completed.

* * * * *